Figure 2:
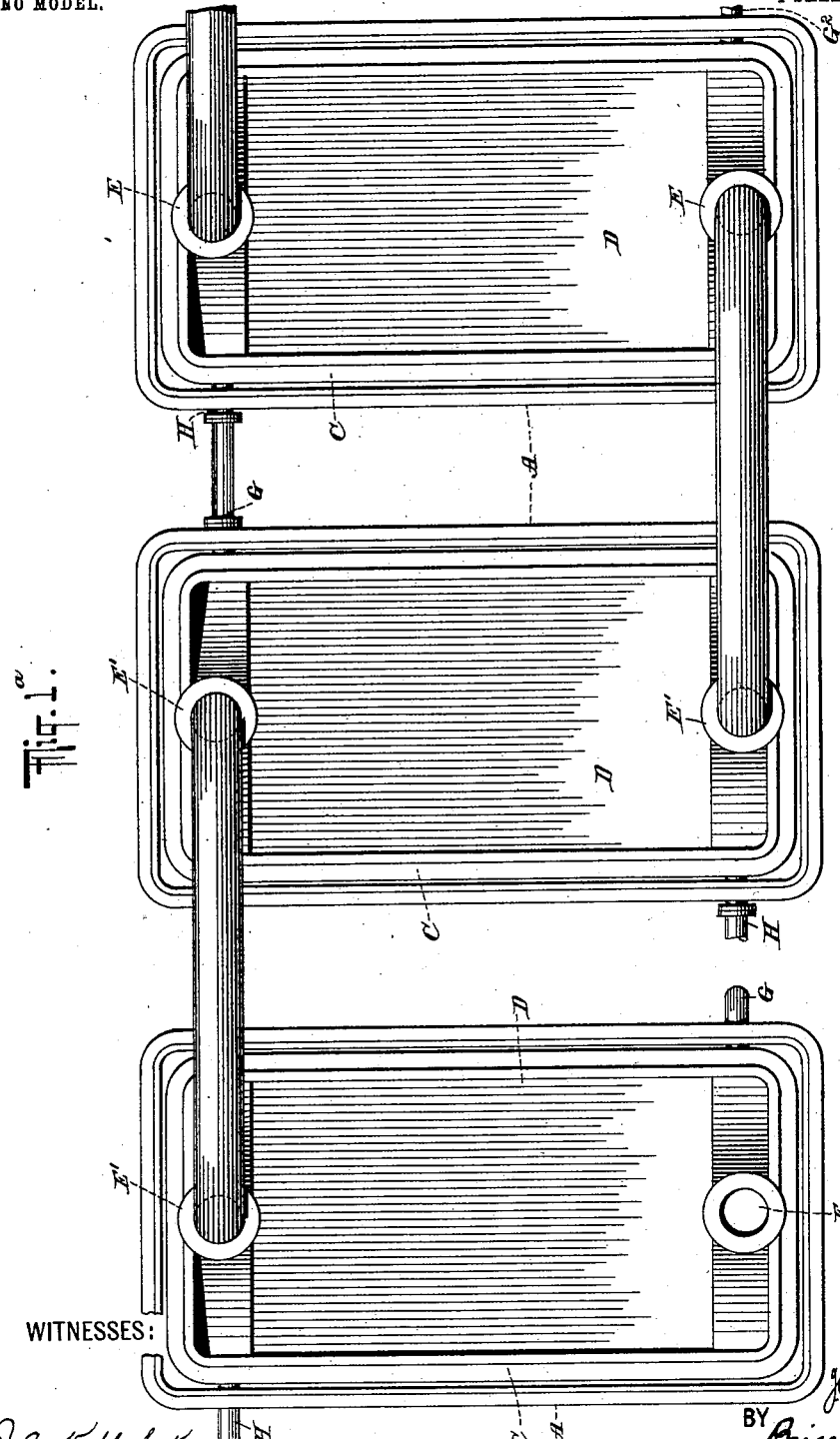

No. 722,981. PATENTED MAR. 17, 1903.
J. B. F. HERRESHOFF.
PROCESS OF MAKING SULFURIC ACID.
APPLICATION FILED JUNE 12, 1902.
NO MODEL. 4 SHEETS—SHEET 1.
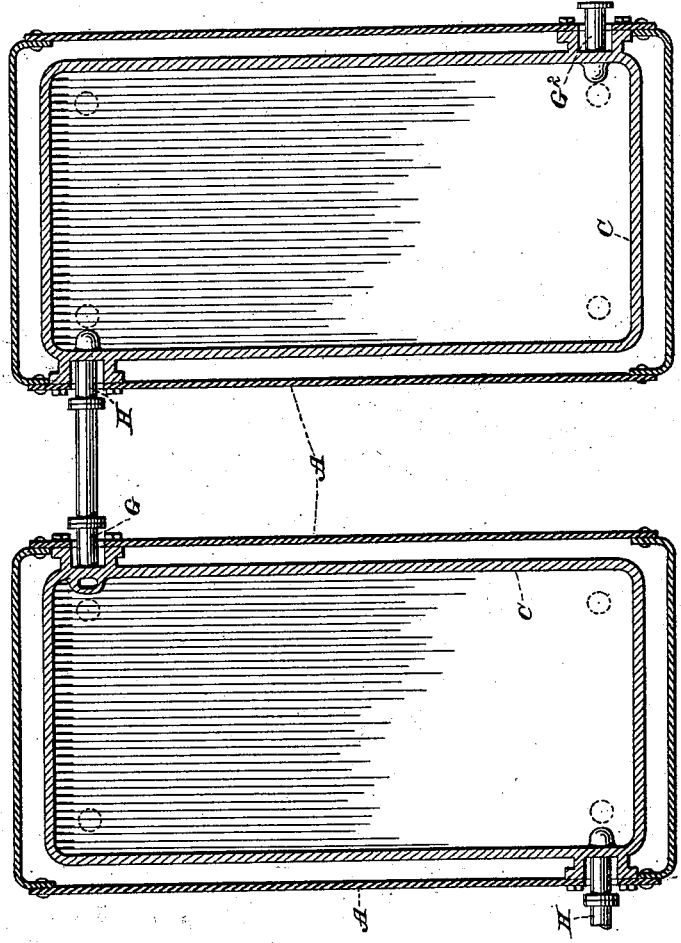
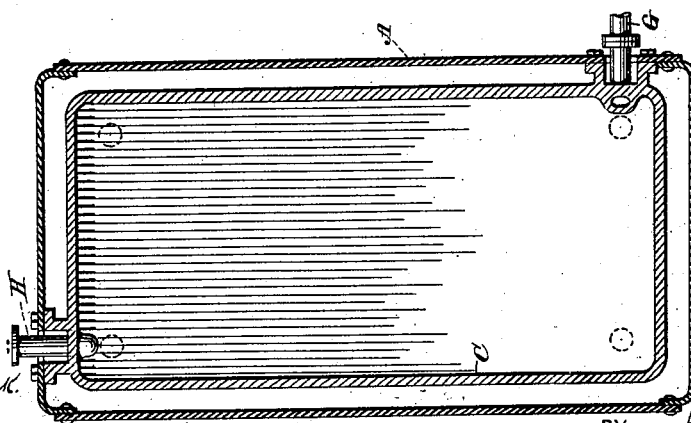
Fig. 1.
WITNESSES: INVENTOR
J. A. Kellenbeck. J. B. F. Herreshoff
John Lotka BY Bresent Knauth
ATTORNEYS No. 722,981. PATENTED MAR. 17, 1903.
J. B. F. HERRESHOFF.
PROCESS OF MAKING SULFURIC ACID.
APPLICATION FILED JUNE 12, 1902.
NO MODEL. 4 SHEETS—SHEET 3.

No. 722,981. PATENTED MAR. 17, 1903.
J. B. F. HERRESHOFF.
PROCESS OF MAKING SULFURIC ACID.
APPLICATION FILED JUNE 12, 1902.
NO MODEL. 4 SHEETS—SHEET 4.

WITNESSES: INVENTOR
J. A. Schlenker. J. B. F. Herreshoff
John Lotka BY Briesen Knauth
ATTORNEYS

UNITED STATES PATENT OFFICE.

JOHN B. F. HERRESHOFF, OF NEW YORK, N. Y., ASSIGNOR TO GENERAL CHEMICAL COMPANY, OF NEW YORK, N. Y., A CORPORATION OF NEW YORK.

PROCESS OF MAKING SULFURIC ACID.

SPECIFICATION forming part of Letters Patent No. 722,981, dated March 17, 1903.

Application filed June 12, 1902. Serial No. 111,270. (No specimens.)

*To all whom it may concern:*

Be it known that I, JOHN B. F. HERRESHOFF, a citizen of the United States, and a resident of the borough of Manhattan, city, county, and State of New York, have invented certain new and useful Improvements in the Manufacture of Sulfuric Acid, of which the following is a specification.

My invention relates to the manufacture of sulfuric acid by the absorption of sulfuric anhydrid in sulfuric acid, and has for its object to provide an improved process by the use of which the absorption can be effected very thoroughly and rapidly and by which acid of great strength and purity will be obtained, and incidentally the process is carried out under such conditions that the acid will have very little, if any, effect upon iron, so that this material may be utilized for the absorber without any danger of excessive corrosion of the receptacle or contamination of the acid.

It has been customary for a long time to absorb the sulfuric anhydrid, or rather gases containing sulfuric anhydrid, in sulfuric acid of relatively low concentration, so that the strength of the acid was increased by the absorption of the anhydrid, and thus sulfuric acid of the desired strength was finally produced. This procedure was, as a rule, carried out in successive stages with acids of different strength. I have found that the absorption of the sulfuric anhydrid takes place much more quickly and that the process yields a much better product if the sulfuric acid used for absorbing the anhydrid is from the very beginning of the operation of about the same strength which is intended to be the final strength of the finished product. In other words, if it is desired to produce acid of ninety-seven or ninety-eight per cent. I do not, as heretofore, start with acid of lower strength, but fill the absorber from the beginning with sulfuric acid of ninety-seven or ninety-eight per cent. and lead the mixture containing the sulfuric anhydrid into this strong acid. Of course in order to preserve this degree of concentration it is necessary to counteract the tendency of the sulfuric anhydrid to increase the strength of the acid, and this I do by continuously adding in the proper proportion to the anhydrid admitted a diluting agent, which might be steam, water, or relatively weak sulfuric acid. The purpose of this step is to continuously maintain the sulfuric acid at the same degree of concentration, so that the absorption of the anhydrid takes place under unvarying conditions, thus securing a very efficient, economical, and uniform procedure.

In order to better explain my invention, I will now proceed to describe it with reference to the accompanying drawings, in which—

Figure 3:
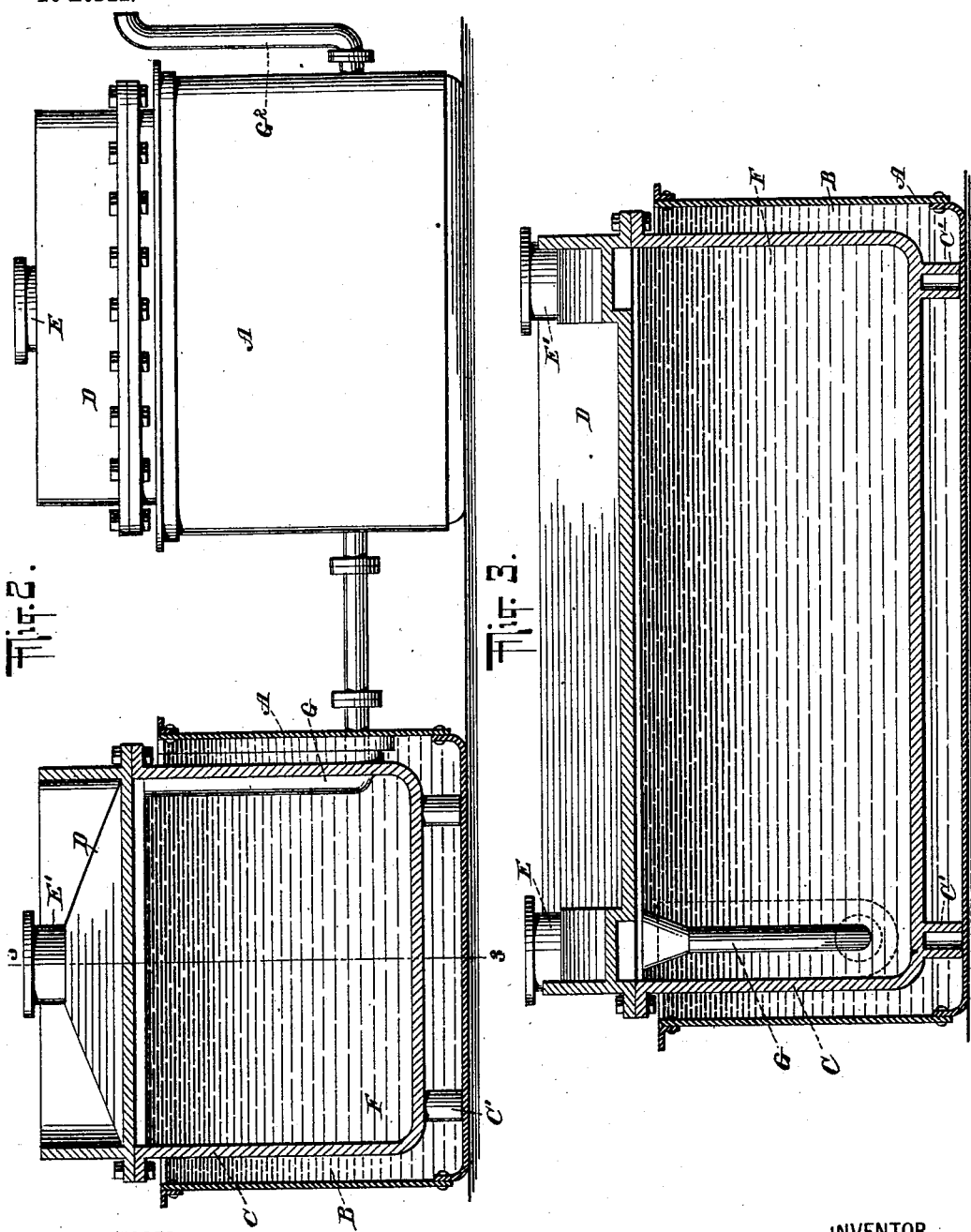
Figure 4:
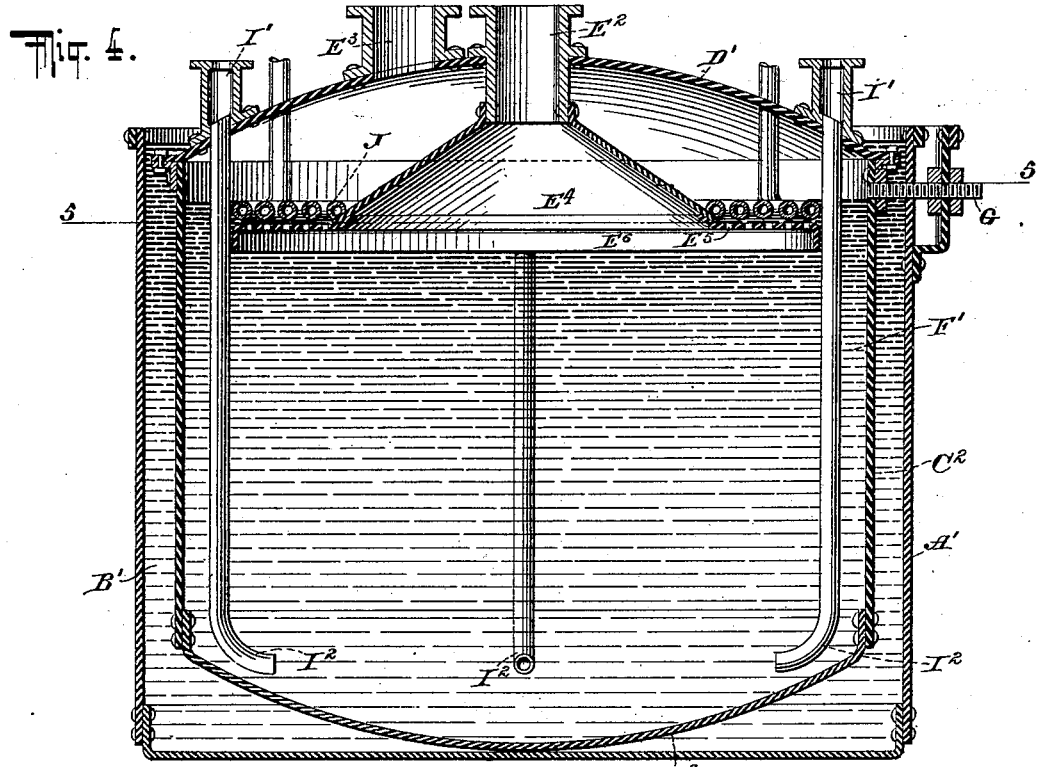

Figure 1 is a sectional plan of three absorbers for the purpose of my invention. Fig. 1ᵃ is a plan or top view of the same parts. Fig. 2 is an elevation of two of the absorbers, one of them appearing in section. Fig. 3 is a sectional elevation on line 3 3 of Fig. 2. Fig. 4 is a sectional elevation on line 4 4 of Fig. 5 of another absorber suitable for the purposes of my invention, and Fig. 5 is a sectional plan of the same on line 5 5 of Fig. 4.

Each of the absorbers shown in Figs. 1, 1ᵃ, 2, and 3 comprises an outer receptacle A, adapted to receive a body B of water or other cooling fluid, and also the absorber proper, C, which is generally made of iron and has legs C' to support it at a distance from the bottom of the receptacle A. The absorber C is provided with a roof-shaped top D, at the ends of which are located nipples or tubular connections E E', respectively, one of which is adapted to serve as an inlet for the mixture containing the sulfuric anhydrid, while the other serves as an outlet for the escaping gases and vapors. The absorber from which the finished product is to be drawn is filled at the beginning of the operation with a body of sulfuric acid F, the strength of which should be the same as that of the acid it is desired to produce. For instance, I may employ acid containing from ninety-seven to ninety-nine per cent. of $H_2SO_4$, or acid containing more than twenty-seven per cent. of free $SO_3$. Each of these particular strengths of the acid offers the advantage that acid of this particular strength has a very slight corroding action, if any, upon iron, so that this metal may be used as a material for the absorber, and the finished product will contain only small traces of iron. When employing acid of ninety-seven to ninety-nine per cent., I secure the further advantage of a rapid and thorough absorption, as acid of this strength has a particularly strong power of absorbing sulfuric anhydrid.

I may, for instance, fill the first absorber A with fuming sulfuric acid containing twenty-seven per cent. of free sulfuric anhydrid, or more. A certain amount of sulfuric acid of one hundred and twenty-seven per cent.—that is, with twenty-seven per cent. of free anhydrid—may then be withdrawn at the outlet or overflow G, while through the inlet H is supplied a diluting agent (steam, water, or weak acid) in sufficient amount to maintain the body of acid in the absorber at its original strength of one hundred and twenty-seven per cent. or more. Only a relatively small portion of the anhydrid is absorbed in the first absorber, and the remainder passes from the outlet E' to the inlet E of the second absorber, which may contain a body of acid of, say, ninety-five per cent. Simultaneously with the anhydrid I admit a diluting agent—say acid of ninety-three per cent.—so as to maintain the body of acid at ninety-five per cent. The resulting acid of ninety-five per cent. passes from the outlet or overflow G to the inlet H of the third absorber, which is filled with strong sulfuric acid—say acid of ninety-seven to ninety-nine per cent. In each absorber the level of the body of acid F should be but slightly below the horizontal inner surface of the top D, so that a very narrow channel of approximately rectangular cross-section is provided for the passage of the gases from the inlet to the outlet, and this channel is of comparatively considerable length. Thus I obtain a very large surface contact of the gases with the liquid body of the acid and an efficient absorption is secured, notwithstanding the fact that the gases are not caused to pass through the liquid acid, but only in contact with the surface thereof. In order to maintain the level of the liquid acid at the proper height, the outlet through which the liquid escapes may be constructed in the nature of an overflow-pipe G, or, as shown for the last absorber, the outlet-pipe $G^2$ may take the liquid from the bottom, where it is coolest. This pipe may be connected with suitable receptacles for storing the acid produced. In order to maintain the body of acid F at its original strength, or say ninety-seven to ninety-nine per cent. $H_2SO_4$, notwithstanding the absorption of sulfuric anhydrid, I admit to the said body continuously, as through the inlet H, a suitable diluent—such as, for instance, water, steam, or weak acid, eighty-eight per cent. being a suitable strength for this purpose—or, as stated, I may employ the ninety-five-per-cent. acid from the second absorber. The mixture admitted at the inlet E consists, as a rule, of about six parts of sulfuric anhydrid, six parts of oxygen, and eighty-eight parts of nitrogen. The gases leaving at the last outlet E' consist largely of oxygen and nitrogen, with a slight remainder of sulfuric anhydrid. I may, as described, lead the gases from the outlet E' of one absorber to the inlet E of the next. In order to give the gases the required speed, I may employ any device for producing pressure, such as a fan operating by suction or as a blower.

Figure 5:
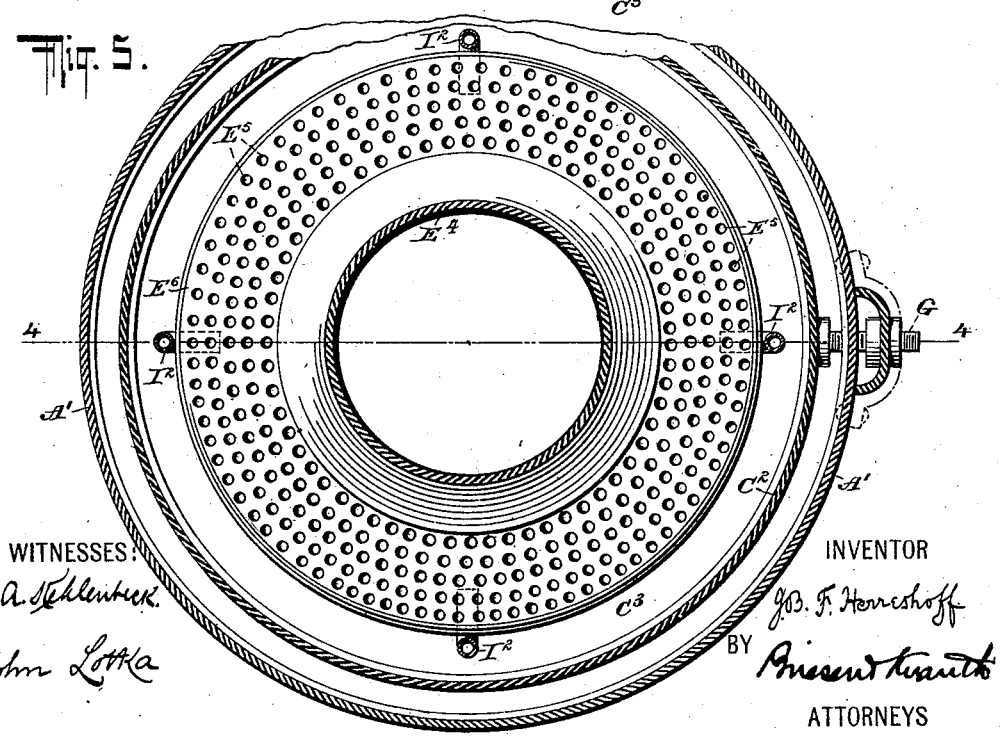

The absorber shown in Figs. 4 and 5 comprises an outer receptacle A', containing a body of water B', and an inner receptacle or absorber proper, $C^2$, having a curved bottom $C^3$, which rests on the bottom of the receptacle A'. The top D' of the absorber is provided with an inlet $E^2$ for the mixture of gases containing the sulfuric anhydrid, an outlet $E^3$ for the unabsorbed gaseous products, and one or more inlets I' for the water, weak acid, or other diluent. With these inlets I' are preferably connected tubes $I^2$, extending close to the bottom of the absorber $C^2$. Inasmuch as the weak acid or other substance admitted through these tubes is specifically lighter than the strong acid F' contained in the absorber, it follows that the weak acid will rise to the surface and will produce an eddying motion in the body of strong acid. The outlet of strong acid is located at G' and consists of a short tube, which is removably fitted into the absorber proper and into the outer receptacle A'. With the anhydrid-inlet $E^2$ is connected at the bottom a funnel-shaped body $E^4$, which dips into the acid F' and is provided at its bottom with an annular perforated plate $E^5$, having at its outer edge a depending rim or flange $E^6$, which is preferably imperforate. Submerged in the acid above the plate $E^5$ is a coil J, through which a cooling medium may circulate.

The gaseous mixture which enters through the inlet $E^2$ passes into the funnel $E^4$ and into the acid F' and finally rises through the upper layers of the liquid acid by way of the perforations in the plate $E^5$. In thus rising through said perforations the gases produce a suction and carry along with them portions of the liquid, so that a strong agitation of the upper layers is obtained, which is further increased by the rising action of the weak acid, as hereinbefore mentioned. Owing to the fact that the liquid is kept in continuous motion and that the gas is divided into fine jets below the level of the liquid, the absorption takes place very rapidly and thoroughly, so that the gaseous mixture escaping at the outlet $E^3$ contains very little sulfuric anhydrid—in practice no more than .005 per cent. If desired, the outlet $E^3$ may be connected with the inlet $E^2$ of a similar apparatus. The cooling-coil J counteracts the rise of temperature due to the absorption of the anhydrid.

It will be understood that whatever apparatus is used for the absorption of the sulfuric anhydrid the absorber contains at the beginning of the operation—that is, even before any sulfuric anhydrid is admitted—liquid acid of substantially the same strength as the product it is desired to discharge from the absorber. When this liquid acid is of a strength from ninety-seven to ninety-nine per cent., it offers certain advantages in regard to its absorbing power and in regard to its action on iron, which render the use of acid of the strength named particularly desirable. Acid of one hundred and twenty-seven per cent. or more also has but little effect on iron. The diluting agent is of course admitted simultaneously with the sulfuric-anhydrid mixture in sufficient quantities to maintain the liquid sulfuric acid at or near its original degree of concentration. Preferably the diluting agent should be cool, so as to counteract, in a measure, the heating effect incident upon the absorption of the gas by the liquid.

I claim as my invention—

1. The process of manufacturing sulfuric acid, which consists in causing sulfuric anhydrid to be absorbed by a body of liquid acid and simultaneously supplying a diluting agent in sufficient quantity to maintain the liquid acid at its original degree of concentration, so that from the start of the operation to the discharge of the finished product, the strength of the sulfuric acid remains unaltered.

2. The herein-described process for manufacturing sulfuric acid, which consists in providing a body of liquid acid of substantially the same strength as the product it is desired to obtain, causing sulfuric anhydrid to be absorbed by said acid and supplying simultaneously with the sulfuric anhydrid a sufficient amount of a diluting agent to said body of liquid acid, to keep said liquid acid at a constant degree of concentration from the beginning of the operation to the end.

3. The process of manufacturing sulfuric acid which consists in causing sulfuric anhydrid to be absorbed by liquid sulfuric acid and supplying simultaneously with the sulfuric anhydrid a cool diluting agent in sufficient quantity to maintain the liquid acid at its original degree of concentration.

4. The process of manufacturing sulfuric acid, which consists in causing sulfuric anhydrid to be absorbed by liquid sulfuric acid, supplying simultaneously with the anhydrid a diluting agent in sufficient quantity to keep the liquid acid at its original degree of concentration, and cooling the liquid acid where it absorbs the anhydrid.

In witness whereof I have hereunto set my hand in the presence of two subscribing witnesses.

JOHN B. F. HERRESHOFF.

Witnesses:
JOHN LOTKA,
EUGENE EBLE.